(12) United States Patent
Yoon et al.

(10) Patent No.: US 7,507,498 B2
(45) Date of Patent: Mar. 24, 2009

(54) SECONDARY BATTERY MODULE HAVING PIEZO SENSOR

(75) Inventors: Yeo Won Yoon, Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 238 days.

(21) Appl. No.: 11/406,641

(22) Filed: Apr. 19, 2006

(65) Prior Publication Data

US 2006/0246345 A1    Nov. 2, 2006

(30) Foreign Application Priority Data

Apr. 20, 2005  (KR) .................. 10-2005-0032926

(51) Int. Cl.
*H01M 2/00* (2006.01)
*H01M 10/50* (2006.01)
(52) U.S. Cl. .......................... 429/61; 429/120
(58) Field of Classification Search .............. 429/61
See application file for complete search history.

(56) References Cited

U.S. PATENT DOCUMENTS

| 5,279,910 | A |  | 1/1994 | Sasaki et al. ............... 429/213 |
| 5,437,942 | A |  | 8/1995 | Murata et al. ............... 429/192 |
| 5,972,539 | A |  | 10/1999 | Hasegawa et al. ............ 429/304 |
| 6,208,115 | B1 | * | 3/2001 | Binder ....................... 320/108 |
| 6,498,406 | B1 | * | 12/2002 | Horiuchi et al. ............. 307/150 |
| 2003/0027036 | A1 | * | 2/2003 | Emori et al. .................. 429/61 |

FOREIGN PATENT DOCUMENTS

KR    10-2005-0036751    4/2005

* cited by examiner

*Primary Examiner*—Dah-Wei D Yuan
*Assistant Examiner*—Steven Scully
(74) *Attorney, Agent, or Firm*—Cantor Colburn LLP

(57) ABSTRACT

Disclosed herein is a secondary battery module comprising a plurality of unit cells stacked one on another, wherein the unit cells are spaced apart from each other such that a channel for heat dissipation is defined between the unit cells, the battery module further comprises at least one piezoelectric sensor mounted in the channel, and the at least one piezoelectric sensor is connected to a battery management system (BMS). According to the present invention, the piezoelectric sensor is mounted in the channel defined between the unit cells of the secondary battery module. Consequently, no additional space for installing the piezoelectric sensor is needed, and therefore, the increase of the size of the battery module is effectively prevented. Furthermore, the change of the internal pressure of the battery is accurately detected by the piezoelectric sensor, and therefore, the expansion or the explosion of the battery caused due to the overcharge or overheating of the unit cells is effectively prevented.

7 Claims, 2 Drawing Sheets

SECONDARY BATTERY MODULE HAVING PIEZO SENSOR

FIELD OF THE INVENTION

The present invention relates to a secondary battery module, and, more particularly, to a secondary battery module wherein a piezoelectric sensor is mounted in a channel defined between unit cells when the unit cells are arranged to assemble the secondary battery module, such that, when the internal pressure of the unit cells is increased due to the abnormal operation of the unit cells, pressure caused by the expansion of the unit cells is applied to the piezoelectric sensor, voltage is generated at the output terminal of the piezoelectric sensor, and the generated sensor voltage is transmitted to a control unit, such as a battery management system (BMS), at which a control algorithm is performed, whereby the expansion or the explosion of the battery caused due to the overcharge or overheating of the unit cells is effectively prevented, and therefore, the stability of battery is improved.

BACKGROUND OF THE INVENTION

As mobile devices have been increasingly developed, and the demand of such mobile devices has increased, the demand of secondary batteries has also sharply increased as an energy source for the mobile devices. Accordingly, much research on batteries corresponding to various needs thereof has been carried out.

Especially, the demand of a lithium secondary battery has sharply increased because the lithium secondary battery has a higher voltage than a conventional nickel-cadmium battery or a conventional nickel-metal hydride battery, and an increased number of charge and discharge cycles are possible for the lithium secondary battery.

In terms of its external shape, the demand of a rectangular battery and a pouch-shaped battery is high because the rectangular battery and the pouch-shaped battery have a small thickness, and therefore, the rectangular battery and the pouch-shaped battery can be easily applied to various products, such as a mobile phone. In terms of its material, the demand of a lithium secondary battery, such as a lithium cobalt polymer battery, is high because the lithium secondary battery has high energy density and discharge voltage.

FIG. 1 illustrates an exemplary structure of a pouch-shaped secondary battery 100.

Referring to FIG. 1, the secondary battery includes an electrode assembly 300, electrode taps 302 and 304 extending from the electrode assembly 300, electrode leads 400 and 410 welded to the electrode taps 302 and 304, respectively, and pouch-shaped case 200 for receiving the electrode assembly 300.

The electrode assembly 300 is a structural member including cathodes, anodes, and separators disposed between the cathodes and the anodes for isolating the cathodes and the anodes from each other, which are stacked successively in the order of one cathode, one separator, and one anode. The electrode taps 302 and 304 extend from the respective electrode plates of the electrode assembly 300. The electrode leads 400 and 410 are electrically connected to the electrode taps 302 and 304 extending from the respective electrode plates. The electrode leads 400 and 410 are partially exposed from the case 200. The case 200 provides a space for receiving the electrode assembly 300. In the case that the electrode assembly 300 is a stack-type electrode assembly as shown in FIG. 1, the inner upper end of the case 200 is spaced apart from the electrode assembly 300 such that the plurality of cathode taps 302 are attached to each other, which are then coupled to the electrode lead 400, and the plurality of anode taps 304 are attached to each other, which are then coupled to the electrode lead 410.

The electrode assembly 300 is placed in the case 200 while the electrode leads 400 and 410 are partially exposed to the outside, an electrolyte is poured into the case 200, and heat and pressure are applied to the edge of an upper case and the edge of a lower case, while the edge of the upper case and the edge of the lower case is in contact with each other, such that the edge of the upper case and the edge of the lower case can be securely fixed to each other by thermal welding. In this way, the pouch-shaped secondary battery 100 is completed.

Although the lithium secondary battery has many advantages as compared to the conventional nickel-cadmium battery or the conventional nickel-metal hydride battery, the lithium secondary battery has a problem in that the lithium secondary battery is weak. Specifically, the electrolyte is poured at the latter process during the manufacture of the battery. For this reason, an organic solvent having a low boiling point is frequently used. In this case, however, when the battery is overcharged or when the battery is left at high temperature, the electrode assembly or the battery case may swell due to the increase of the internal pressure of the battery. As a result, the case may be deformed. This deformation of the case may cause the explosion of the battery.

In order to solve the above-mentioned problem, a method of hardening a plane-type battery using ultraviolet rays or electron beams, and a method of coating gel to the electrode plates instead of pouring the electrolyte have been proposed (U.S. Pat. No. 5,972,539, U.S. Pat. No. 5,279,910, and U.S. Pat. No. 5,437,942). These conventional methods somewhat alleviate the swelling of the electrode assembly or the battery case. However, satisfactory stability is not guaranteed by these conventional methods.

Some conventional technologies propose a system in which a strain gauge type sensor is attached to the surface of the pouch-shaped battery, a protection circuit mounted between the terminals (the cathode and the anode) of the battery and the input and output terminals interrupts the operation of the battery based on a value detected by the pressure sensor. Specifically, when the case of the battery, i.e., the pouch, swells, the degree of the swelling is detected by the sensor, and the detected value is transmitted to the protection circuit, which interrupts the current flowing between the cathode and the anode when the detected value exceeds a predetermined level.

However, the above-described system for measuring the swelling of the battery case does not provide high reliability. Also, it is difficult to stably mount the sensor to the surface of the pouch-shaped battery for the purpose of accuracy measurement. For example, as the size and the weight of the battery have been reduced, it is very difficult to accurately measure the swelling of the battery case depending upon the change of the surface area of the battery case. Also, the strain gauge type sensor requires large area for accurate measurement. As a result, the heat dissipation from the battery is interrupted by the strain gauge type sensor, which increases temperature of the battery. Furthermore, the strain gauge type sensor cannot be used at all for a rectangular battery, the surface expansion of which is relatively small.

Meanwhile, the secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a battery module having a plurality of cells electrically connected with each other because high output and large capacity are necessary for the medium- or large-sized devices.

FIG. 2 illustrates an exemplary structure of a secondary battery module having a plurality of unit cells stacked one on another.

Referring to FIG. 2, the plurality of unit cells 101, 102, and 103 are stacked one on another with high integration. From the upper ends of the unit cells protrude electrode terminals 401, 411, 402, 412, 403, and 413. The unit cells 101, 102, and 103 may be arranged in different manners in the secondary battery module 500. Generally, the unit cells are stacked as shown in FIG. 2, which provides high integration. Also, the unit cells 101, 102, and 103 are spaced a predetermined distance from each other such that channels 600, in which heat generated during the charge and discharge of the unit cells is removed, are defined between the neighboring unit cells. Generally, a rectangular cell or a pouch-shaped cell is used as the unit cells 101 constituting the secondary battery module 500.

The safety problem of the secondary battery module may be more serious because the plurality of unit cells are stacked one on another in a small space. Specifically, the abnormal operation of some of the unit cells may reduce the abnormal operation of the other unit cells. Therefore, a measure for preventing the above-mentioned problem is urgently required. Until now, however, a technology for effectively guaranteeing the safety of the secondary battery module has not been proposed.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, when a piezoelectric sensor is mounted in a channel defined between unit cells in the course of arranging the unit cells to assemble a secondary battery module, if the unit cells are expanded as the internal pressure of the unit cells is increased, pressure caused by the expansion of the unit cells is applied to the piezoelectric sensor, as such voltage is generated at the output terminal of the piezoelectric sensor, and the generated sensor voltage is transmitted to a battery management system (BMS), at which a control algorithm is performed, whereby the expansion or the explosion of the battery caused due to the overcharge or overheating of the unit cells is effectively prevented. The present invention has been completed based on the above-mentioned discovery.

In accordance with the present invention, the above and other objects can be accomplished by the provision of a secondary battery module comprising a plurality of unit cells stacked one on another, wherein the unit cells are spaced apart from each other such that a channel for heat dissipation is defined between the unit cells, the battery module further comprises at least one piezoelectric sensor mounted in the channel, and the at least one piezoelectric sensor is connected to a control unit.

Consequently, when the unit cells of the secondary battery module according to the present invention are overcharged or overheated, pressure is applied to the piezoelectric sensor mounted in the channel defined between the unit cells due to the increase of internal pressure of the unit cells, voltage is generated at the output terminal of the piezoelectric sensor, and the generated sensor voltage is transmitted to the control unit, at which the control algorithm is performed, whereby the electric conduction between the unit cells is interrupted.

The "unit cells" are secondary cells, which can be continuously charged and discharged. Preferably, the unit cells are rectangular cells or pouch-shaped cells, which can be stacked one on another with high integration in the battery module.

Each of the unit cells has cathodes, anodes, separators, and an electrolyte mounted in a sealed battery case. An electrode assembly including a minute porous separator disposed between a thin film-shaped cathode and a thin film-shaped anode may be wound, or electrode assemblies, each including a cathode, a separator, and an anode, are stacked one on another. Active materials applied to the cathodes and the anodes are not particularly restricted. Preferably, the cathode active material consists of lithium manganese-based oxide having high safety, and the anode active material consists of carbon. The preferable unit cell is a lithium-ion cell or a lithium-ion polymer cell.

The unit cells of the secondary battery module may be stacked one on another in various structures. Here, the "stacking" direction is not particularly restricted so long as the unit cells face each other. For example, the unit cells may face each other while the unit cells are successively stacked one on another on a plane. Alternatively, the unit cells may face each other while the unit cells are in tight contact with each other, and are erected vertically on a plane. According to the present invention, however, it is necessary that the unit cells face each other while the unit cells are spaced a predetermined distance from each other such that a channel for heat dissipation is formed in the stacked structure.

The present invention is characterized in that, when the width of the channel defined between the unit cells is decreased due to the volume expansion of the unit cells caused by the increase of the internal pressure of the unit cells, such change is accurately measured to control the operation of the battery module.

The experiments performed by the inventors revealed that the increase of the internal pressure of the unit cells is greater in the thickness direction of the unit cells than in the longitudinal direction of the unit cells. Specifically, as the internal pressure of the unit cells is increased, the thickness of the unit cells is greatly increased as compared to the surface expansion of the battery case. Consequently, the use of the piezoelectric sensor that is capable of detecting the change of the thickness of the unit cells guarantees more accurate measurement.

Another characteristic of the present invention is that the size of the battery module is not increased although the piezoelectric sensor is mounted in the battery module. Generally, it is required that the battery module be compact and light. For this reason, the increase of the size of the battery module due to the installation of the piezoelectric sensor is not desirable. According to the present invention, the piezoelectric sensor is mounted in the channel, in which the heat generated from the unit cells is effectively removed, and therefore, the size of the battery module is not increased due to the installation of the piezoelectric sensor.

The piezoelectric sensor according to the present invention may be mounted in the channel between the unit cells in such a manner that the piezoelectric sensor is tightly contact with the unit cells a and b located at opposite sides of the piezoelectric sensor, the piezoelectric sensor is attached to one of the unit cells a or b, or the piezoelectric sensor is spaced a predetermined distance from the unit cells a and b.

According to the present invention, the piezoelectric sensor is disposed between the unit cells. Consequently, when the internal pressure of the unit cells is increased due to the abnormal operation of the unit cells, more accurate measurement may be possible by the piezoelectric sensor. Specifically, the change of thickness $\Delta t$ at the respective unit cells a and b located at the opposite sides of the piezoelectric sensor is detected as double the change of thickness ($2\times\Delta t$) by the piezoelectric sensor. Consequently, the measuring accuracy is further increased. This is one of important characteristics of the present invention.

The piezoelectric sensor according to the present invention is not particular restricted so long as the change of the pressure can be measured by the piezoelectric sensor as described above. Various products have been commercially used, and therefore, a detailed description of the piezoelectric sensor will not be given.

Preferably, the piezoelectric sensor is mounted at a position corresponding to the middle part of the battery, at which the change of the thickness is large. The middle part of the battery is spaced by more than 20%, preferably more than 30%, of the length and the width of the battery from the outer circumference of the battery.

According to circumstances, the piezoelectric sensor may be mounted to an additional support while the piezoelectric sensor faces the unit cell located at one side of the at least one piezoelectric sensor or the unit cells located at opposite sides of the at least one piezoelectric sensor. This is preferable in the case that the width of the channel defined between the unit cells is further increased. The support may be a frame member used to assist the unit cells to be stacked one on another or an additional member extending from the frame member.

An exemplary shape of the frame member is disclosed in Korean Patent Application No. 2004-81657, which has been filed in the name of the applicant of the present patent application. The disclosure of the above-mentioned Korean patent application is hereby incorporated by reference as if fully set forth herein.

Preferably, the control unit may be constructed such that the control unit performs a predetermined control process when the sensor voltage transmitted from the piezoelectric sensor is higher than a predetermined critical value.

For example, the control process may include a first-step control process of transmitting a warning signal, a second-step control process of interrupting power, optionally a third-step control process of operating a cooling system, and optionally a fourth-step control process of operating a fire-extinguishing system. These control processes may be successively carried out based on the size of the sensor voltage transmitted from the piezoelectric sensor. When the sensor voltage is continuously transmitted from the piezoelectric sensor or the size of the transmitted sensor voltage is increased even after the supply of power is interrupted, the cooling system or the fire-extinguishing system may be operated depending upon the degree of the abnormality. Alternatively, the cooling system and the fire-extinguishing system may be operated successively.

Although the control unit may be mounted as an independent component in the battery module, it is preferable that the control unit be included in a battery management system (BMS) for managing the overall operations of the battery module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE
NUMERALS OF THE DRAWINGS

| | |
|---|---|
| 100: pouch-shaped secondary battery | 200: pouch-shaped case |
| 300: electrode assembly | 400: electrode lead |
| 500: secondary battery module | 600: channel |
| 700: piezoelectric sensor | |

DETAILED DESCRIPTION OF PREFERRED
EMBODIMENTS

Now, a preferred embodiment of the present invention will be described in detail with reference to the accompanying drawings. It should be noted, however, that the scope of the present invention is not limited by the illustrated embodiment.

Figure 1:
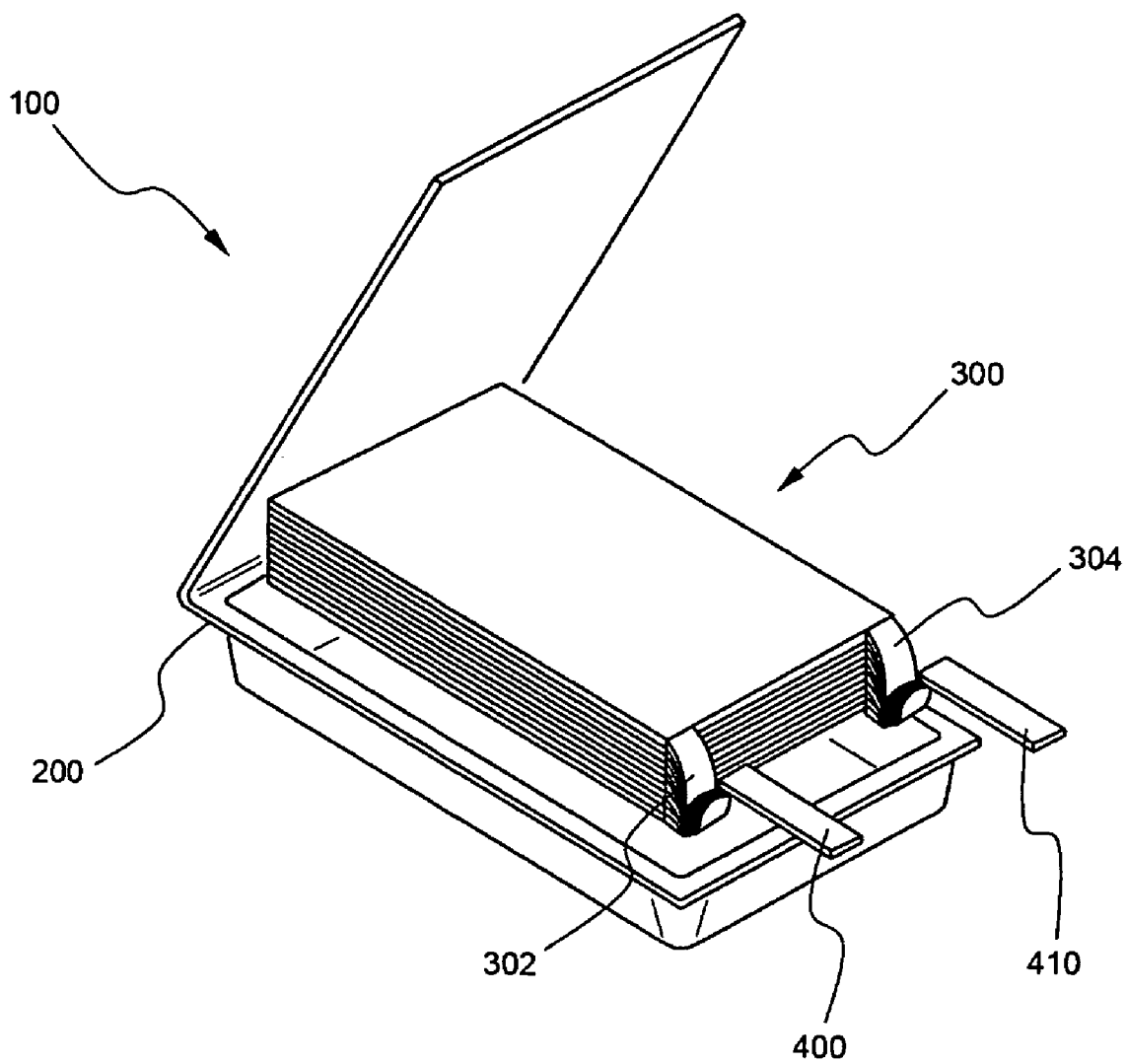
FIG. 1 is an exploded perspective view illustrating a general pouch-shaped battery.
Figure 2:
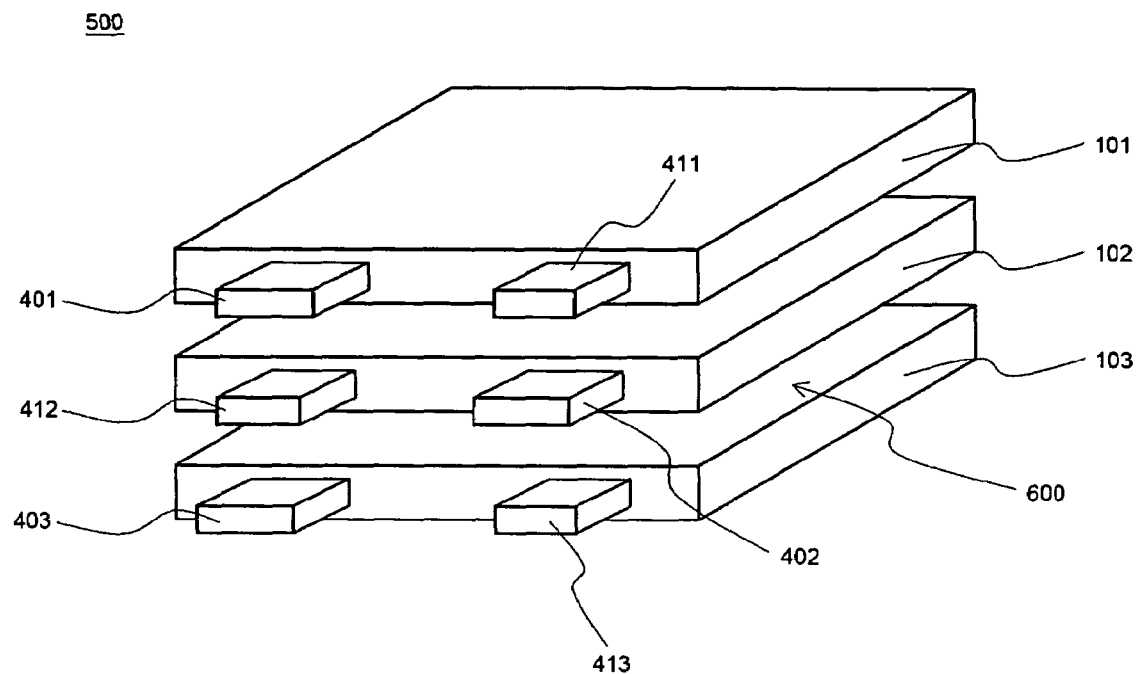
FIG. 2 is a typical view, in part, illustrating the structure of a conventional secondary battery module.
Figure 3:
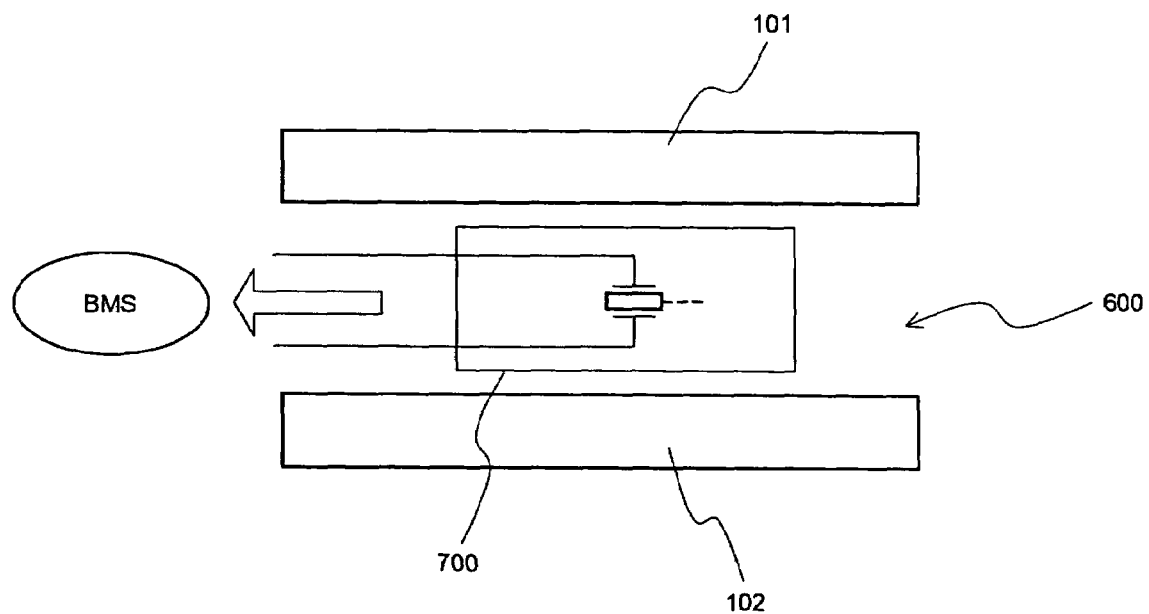
FIG. 3 is a typical view, in part, illustrating a battery module having a piezoelectric sensor mounted in a channel defined between unit cells according to a preferred embodiment of the present invention.

FIG. 3 is a typical view illustrating the structure of a secondary battery module having a piezoelectric sensor according to a preferred embodiment of the present invention.

Referring to FIG. 3, the secondary battery module includes unit cells 101 and 102, which are stacked one on another while being spaced a predetermined distance from each other such that a channel 600, in which heat generated during the charge and discharge of the battery is removed, is defined between unit cells 101 and 102. In the channel 600 is mounted a piezoelectric sensor 700, which detects the increase of the internal pressure of the unit cells 101 and 102 located at opposite sides of the piezoelectric sensor 700. Consequently, no additional space for installing the piezoelectric sensor 700 is needed.

The piezoelectric sensor 700 is connected to a battery management system (BMS), which has an algorithm for controlling the operation of the battery based on the voltage transmitted from the piezoelectric sensor 700.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the piezoelectric sensor is mounted in the channel defined between the unit cells of the secondary battery module. Consequently, no additional space for installing the piezoelectric sensor is needed, and therefore, the increase of the size of the battery module is effectively prevented. Furthermore, the change of the internal pressure of the battery is accurately detected by the piezoelectric sensor, and therefore, the expansion or the explosion of the battery caused due to the overcharge or overheating of the unit cells is effectively prevented.

What is claimed is:

1. A secondary battery module comprising a plurality of unit cells stacked one on another,
   wherein the unit cells are rectangular cells or pouch-shaped cells;
   the unit cells are spaced apart from each other such that a channel for heat dissipation is defined between major surface planes defining the unit cells, and the battery module further comprises at least one piezoelectric sensor connected to a control unit;
   the piezoelectric sensor detects an increase of internal pressure of the unit cells and is mounted in the channel between the unit cells in such a manner that the at least one piezoelectric sensor is one of in intimate contact with both the unit cells
   located at opposite sides of the piezoelectric sensor, attached to a single one of the unit cells, or spaced a predetermined distance from both the unit cells;
   the control unit which is included in a battery management system (BMS) for managing the overall operations of the battery module, performs a predetermined control process when the sensor voltage transmitted from the at least one piezoelectric sensor is higher than a predetermined critical value; and
   the control process includes a first-step control process of transmitting a warning signal and a second-step control process of interrupting power.

2. The battery module according to claim 1, wherein the unit cells are lithium-ion cells or lithium-ion polymer cells.

3. The battery module according to claim 1, wherein the at least one piezoelectric sensor is mounted in the channel at a position corresponding to the middle part of the battery.

4. The battery module according to claim 3, wherein the middle part of the battery is spaced by more than 20% of the length and the width of the battery from the outer circumference of the battery.

5. The battery module according to claim 1, wherein the control process further includes operating a cooling system.

6. The battery module according to claim 5, wherein the control process further includes operating a fire-extinguishing system.

7. The battery module according to claim 1, wherein the control process further includes operating a fire-extinguishing system.

* * * * *